United States Patent
Aumer et al.

(10) Patent No.: US 10,097,819 B2
(45) Date of Patent: Oct. 9, 2018

(54) TESTING SYSTEM, TESTING METHOD, COMPUTER PROGRAM PRODUCT, AND NON-TRANSITORY COMPUTER READABLE DATA CARRIER

(71) Applicant: Rohde & Schwarz GmbH & Co. KG, München (DE)

(72) Inventors: Felix Aumer, München (DE); Rajashekar Durai, Singapore (SG); Gerson Bacor, Singapore (SG); Chun Guan Tay, Singapore (SG); Fernando Schmitt, München (DE); Christoph Nufer, München (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 239 days.

(21) Appl. No.: 15/054,074

(22) Filed: Feb. 25, 2016

(65) Prior Publication Data
US 2017/0150142 A1 May 25, 2017

Related U.S. Application Data

(63) Continuation-in-part of application No. 14/949,789, filed on Nov. 23, 2015.

(30) Foreign Application Priority Data

Dec. 30, 2015 (EP) .................................. 15203058

(51) Int. Cl.
*H04N 17/06* (2006.01)
*H04N 5/92* (2006.01)
(Continued)

(52) U.S. Cl.
CPC ............. *H04N 17/06* (2013.01); *G11B 20/18* (2013.01); *G11B 31/00* (2013.01); *H04N 5/92* (2013.01)

(58) Field of Classification Search
CPC ...... G11B 20/182; G11B 31/00; H04N 17/06; H04N 5/9201
See application file for complete search history.

(56) References Cited

U.S. PATENT DOCUMENTS

| | | | | |
|---|---|---|---|---|
| 5,818,520 A | * | 10/1998 | Janko | H04N 17/004 348/181 |
| 6,141,042 A | * | 10/2000 | Martinelli | H04N 17/004 348/181 |

(Continued)

FOREIGN PATENT DOCUMENTS

| | | |
|---|---|---|
| EP | 0 789 497 A2 | 8/1997 |
| EP | 0 888 019 A1 | 12/1998 |

(Continued)

OTHER PUBLICATIONS

Advisory Action for U.S. Appl. No. 14/949,789, filed Aug. 15, 2017.
(Continued)

*Primary Examiner* — Gelek W Topgyal
(74) *Attorney, Agent, or Firm* — Shumaker & Sieffert, P.A.

(57) ABSTRACT

The present invention provides a testing system for a video and audio reproduction system, the testing system comprising a data source, comprising video and audio data for reproduction by the video and audio reproduction system, the video and audio data comprising unique marks in every video frame and every audio frame, a recording unit, configured to record a video stream and an audio stream generated by the video and audio reproduction system based on the video and audio data, and a test processor, configured to extract the unique marks from the recorded video stream and the recorded audio stream, and to verify if respective unique marks of simultaneous video frames and audio frames have been recorded by the recording unit simultaneously. Furthermore, the present invention provides a test-
(Continued)

ing method, a computer program product, and a non-transitory computer readable data carrier.

12 Claims, 4 Drawing Sheets

(51) Int. Cl.
*G11B 31/00* (2006.01)
*G11B 20/18* (2006.01)

(56) References Cited

U.S. PATENT DOCUMENTS

| | | | |
|---|---|---|---|
| 7,937,723 | B2 | 5/2011 | Weissmueller, Jr. et al. |
| 9,401,150 | B1* | 7/2016 | Dorenbosch .............. G10L 25/69 |
| 2007/0040035 | A1 | 2/2007 | Kotlarsky et al. |
| 2007/0223874 | A1 | 9/2007 | Hentschel |
| 2008/0256394 | A1* | 10/2008 | Rashevsky .......... G06F 11/3616 |
| | | | 714/38.1 |
| 2009/0058986 | A1 | 3/2009 | Beers et al. |
| 2011/0096836 | A1 | 4/2011 | Einarsson |
| 2011/0263243 | A1 | 10/2011 | Topaltzas et al. |
| 2013/0209070 | A1* | 8/2013 | Rivas-Micoud ... H04N 5/44591 |
| | | | 386/285 |
| 2013/0286860 | A1 | 10/2013 | Dorenbosch et al. |
| 2013/0343467 | A1* | 12/2013 | Sogani .................. G06T 7/0002 |
| | | | 375/240.25 |
| 2014/0078867 | A1* | 3/2014 | Nakamura ............ G01S 3/8006 |
| | | | 367/118 |
| 2015/0062353 | A1 | 3/2015 | Dalal et al. |
| 2015/0138307 | A1 | 5/2015 | Karimi-Cherkandi et al. |
| 2015/0189344 | A1 | 7/2015 | Amidei et al. |
| 2016/0078793 | A1* | 3/2016 | Aimonen ................ G09G 3/006 |
| | | | 345/589 |
| 2016/0210716 | A1 | 7/2016 | Ghosh et al. |
| 2016/0225131 | A1* | 8/2016 | Babbar .............. G06K 9/00711 |
| 2016/0301924 | A1* | 10/2016 | Tay ...................... G06K 7/1095 |
| 2017/0147622 | A1* | 5/2017 | Sterzbach ......... G06F 17/30581 |
| 2017/0150140 | A1* | 5/2017 | Nufer ............... H04N 21/23439 |

FOREIGN PATENT DOCUMENTS

| | | | | |
|---|---|---|---|---|
| EP | 1 377 080 A1 | | 1/2004 | |
| EP | 2 239 952 A1 | | 10/2010 | |
| JP | 2008206042 A | * | 9/2008 | ............ H04N 17/00 |
| KR | 100618319 B1 | | 8/2006 | |
| KR | 100727090 B1 | | 6/2007 | |
| KR | 20150019684 A | | 2/2015 | |
| WO | 2007061241 A1 | | 5/2007 | |
| WO | WO 2014/175823 A1 | | 10/2014 | |

OTHER PUBLICATIONS

Final Office Action for U.S. Appl. No. 14/949,789 dated Mar. 21, 2017.
Non-Final Office Action for U.S. Appl. No. 14/949,789 dated Oct. 21, 2016.
Prosecution History from U.S. Appl. No. 14/949,789, dated Oct. 21, 2016 through Nov. 2, 2017, 80 pp.
Response to Office Action dated Oct. 2, 2017, from U.S. Appl. No. 14/949,789, filed Feb. 12, 2018, 16 pp.

* cited by examiner

TESTING SYSTEM, TESTING METHOD, COMPUTER PROGRAM PRODUCT, AND NON-TRANSITORY COMPUTER READABLE DATA CARRIER

PRIORITY CLAIM

This application is a continuation-in-part of U.S. patent application Ser. No. 14/949,789, filed Nov. 23, 2015, the disclosure of which is incorporated herein by reference in its entirety. This application further claims the priority benefit of European Patent Application No. 15203058.1, filed Dec. 30, 2015, the disclosure of which is incorporated herein by reference in its entirety.

TECHNICAL FIELD

The invention relates to a testing system, a testing method, a computer program product, and a non-transitory computer readable data carrier.

BACKGROUND

Although applicable to any system that reproduces audio and video data, the present invention will primarily be described in combination with mobile phones or smartphones.

On modern electronic devices like smartphones or smart TVs a plurality of applications and background tasks can be running. Such applications and background tasks reduce the free resources e.g. of a respective processor.

Furthermore, every time more complex and computational intensive encoding algorithms are used to encode videos of higher and higher resolutions as effectively as possible. Decoding such a video requires a high amount of processing power.

Therefore, it has to be ensured that audio and video data of a video can be synchronously reproduced by a specific device, even if applications or background tasks are running on the device.

Currently, there are no measuring systems available which can be used to easily identify an asynchrony between audio frames and video frames, when reproduced e.g. on a smartphone.

Accordingly, there is a need for measuring asynchrony between audio and video frames of a video, when the video is reproduced.

SUMMARY

This problem is solved by a testing system, a testing method, a computer program product, and a non-transitory computer readable data carrier as claimed.

A testing system for a video and audio reproduction system, like, e.g. a television, a smartphone, a computer or the like, comprises a data source with video and audio data for reproduction by the video and audio reproduction system, the video and audio data comprising unique marks in every video frame and every audio frame, a recording unit, configured to record a video stream and an audio stream generated by the video and audio reproduction system based on the video and audio data, and a test processor, configured to extract the unique marks from the recorded video stream and the recorded audio stream, and to verify if respective unique marks of simultaneous video frames and audio frames, i.e. frames which in the original video and audio data are provided as simultaneous frames, have been recorded by the recording device simultaneously. The test processor can also determine the displacement in time between the simultaneous video frames and audio frames.

Furthermore, a testing method for a video and audio reproduction system comprises providing a data source comprising video and audio data, the video and audio data comprising unique marks in every video frame and every audio frame, reproducing the video and audio data with the video and audio reproduction system, recording a video stream and an audio stream generated by the video and audio reproduction system based on the video and audio data, extracting the unique marks from the recorded video stream and the recorded audio stream, and verifying if respective unique marks of simultaneous video frames and audio frames have been recorded by the recording device simultaneously.

Further, a computer program product comprises computer readable instructions, which when executed by a processor cause the processor to perform a method according to the present invention. The computer program product can e.g. be a smartphone app, wherein the camera of the smartphone is used to record a video, which is displayed on the smartphone's display, and the microphone of the smartphone is used to record audio data which is reproduced by the smartphones' speakers. To record a video of the smartphones' screen with the camera of the smartphone one or more mirrors can e.g. be placed accordingly.

Finally, a non-transitory computer readable data carrier comprises video and audio data for reproduction by the video and audio reproduction system, the video and audio data comprising unique marks in every video frame and every audio frame.

The present invention is based on the conclusion that testing video reproduction and audio reproduction separately doesn't allow testing synchrony of a video.

Therefore, the present invention uses this knowledge and uses a specifically prepared data source, which comprises audio and video data for simultaneous reproduction. The audio frames and the video frames both comprise unique marks, which allow unambiguously identifying every single audio frame and video frame.

Therefore, the audio and video data, e.g. a video file, is reproduced on e.g. a smartphone and the output, visual and audible, of the smartphone is recorded. The recorded data can then be analysed for synchrony of the audio and video data reproduced by the smartphone.

To analyse synchrony the test processor can extract the unique marks from the recorded audio stream and the recorded video stream and test if an audio frame and a video frame recorded at the same time comprise the right marks. The term "right marks" refers to two marks, which identify an audio frame and a video frame, which on the data source form a pair, i.e. should be reproduced simultaneously by the smartphone. If an audio frame and a video frame recorded at the same time do not comprise the right marks, the displacement between two simultaneous audio frames and a video frames can be determined.

Summing up, with the present invention only a simple video has to be reproduced on the video and audio reproduction system with specifically prepared audio and video frames, which can be recorded and analysed accordingly. The present invention, therefore, allows testing synchrony in playback of a video on a video and audio reproduction system with very little effort.

Further embodiments of the present invention are subject of the further subclaims and of the following description, referring to the drawings.

In a possible embodiment, the recording unit can comprise a video recording unit, like a camera or a barcode scanner, which records the unique marks in the video frames, and an audio recording unit, like a microphone, which records the unique marks in the audio frames. In an embodiment, the recording unit can be the smartphone, on which the video and audio data is reproduced. That means that the smartphone under test at the same time is part of the testing unit. The displayed video can e.g. be recorded with the smartphone's camera using a mirror or the like. The test processor can in this case e.g. be part of a smartphone app that runs on the smartphone.

In a possible embodiment, the unique marks in the video frames can comprise an optical code, especially a barcode or a QR code, comprising a unique identification number for said video frame. Such optical codes can be analysed and evaluated efficiently, because they have been specifically designed for visual evaluation.

In a possible embodiment, an audio frame is an audio sequence with the length of a respective video frame. The unique marks in the audio frames can comprise an audio code, especially a sinusoidal sound wave of a respective frequency. The audio stream can therefore also be called a single tone signal, wherein the frequency changes over time. It is to be understood, that the term audio frame does not necessarily mean that a single audio stream is provided for every frame. The term frame simply refers to a section in an audio stream, which is timely related to a single video frame. The duration of a single audio frame is therefore defined by 1/fps, where fps is the frame rate of the video data. If a single audio frame comprises only the unique mark, i.e. a sinusoidal sound wave of a given frequency, this unique mark can be evaluated very efficiently, because no disturbances overlay the mark.

In a possible embodiment, the frequencies of the sinusoidal sound waves can range from a minimum frequency, especially 1000 Hz, to a maximum frequency, especially 20000 Hz. The given frequencies are only examples. It is to be understood, that any other frequency range can be used instead.

In a possible embodiment, the frequencies of the sinusoidal sound waves of two consecutive audio frames are spaced apart by a first threshold value, especially by 1000 Hz. That means, that e.g. the mark of a first audio frame has a frequency of 1000 Hz, of a second audio frame a frequency of 2000 Hz and so on. This allows easily distinguishing the audio marks. The frequency of the audio frames therefore instead of increasing continuously increases in a step-like pattern.

In a possible embodiment, the frequencies of the sinusoidal sound waves sequentially increase by the first threshold value until the maximum frequency is reached and then fall back to the minimum frequency plus a second threshold value, especially 20 Hz. These frequencies from the minimum to the maximum frequency can also be called one frequency sequence. In an embodiment, the second threshold value increases with every repetition of the frequency sequence by its starting value, e.g. 20 Hz. That means that a mark in a first audio frame of a first frequency sequence can e.g. have a frequency 1000 Hz, and a mark in a first audio frame of a second frequency sequence can e.g. have a frequency 1020 Hz.

Using the first threshold value and the second threshold value in the frequency sequences provides marks with a huge distance in frequency in consecutive frames and at the same time allows uniquely identifying a high number of different frames in the given frequency range.

In a possible embodiment, to extract the respective frequency from an audio frame the test processor is configured to perform a Short-Time-Fourier transformation of the recorded audio stream. The length of the time windows used for the Short-Time-Fourier transformation can be smaller than the length of the audio frames and video frames. The window size can e.g. be 220 samples at a sampling rate of 44.1 kHz. The Overlap between two windows can e.g. be 176 samples. This configuration allows a time resolution of about 1ms for the frequency data.

In a possible embodiment, the test processor can be configured to analyse the time difference between a video frame and the according audio frame based on the results of the Short-Time-Fourier transformation by comparing the mark of the video frame with the frequency that results from the Short-Time-Fourier transformation for the audio frame which was recorded simultaneously with the respective video frame.

To make the comparison simpler, the marks of the video frames can comprise the frequency of the respective audio frame as a digital number.

In a possible embodiment the a measurement system can be used for measuring a change between a first video sequence having a first video quality and a second video sequence having a second video quality of a device under test, the method comprising a video signal source providing said first video sequence having said first video quality and said second video sequence having said second video quality, and detecting means for detecting identification means, like the unique marks explained above, which are different for said first video sequence and said second video sequence.

In a possible embodiment said identification means can be an optical or acoustical pattern. The identification means can be a bar code or a QR code for an optical pattern or a sound sequence for an acoustical pattern.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

In the figures like reference signs denote like elements unless stated otherwise.

DETAILED DESCRIPTION OF THE DRAWINGS

Figure 1:
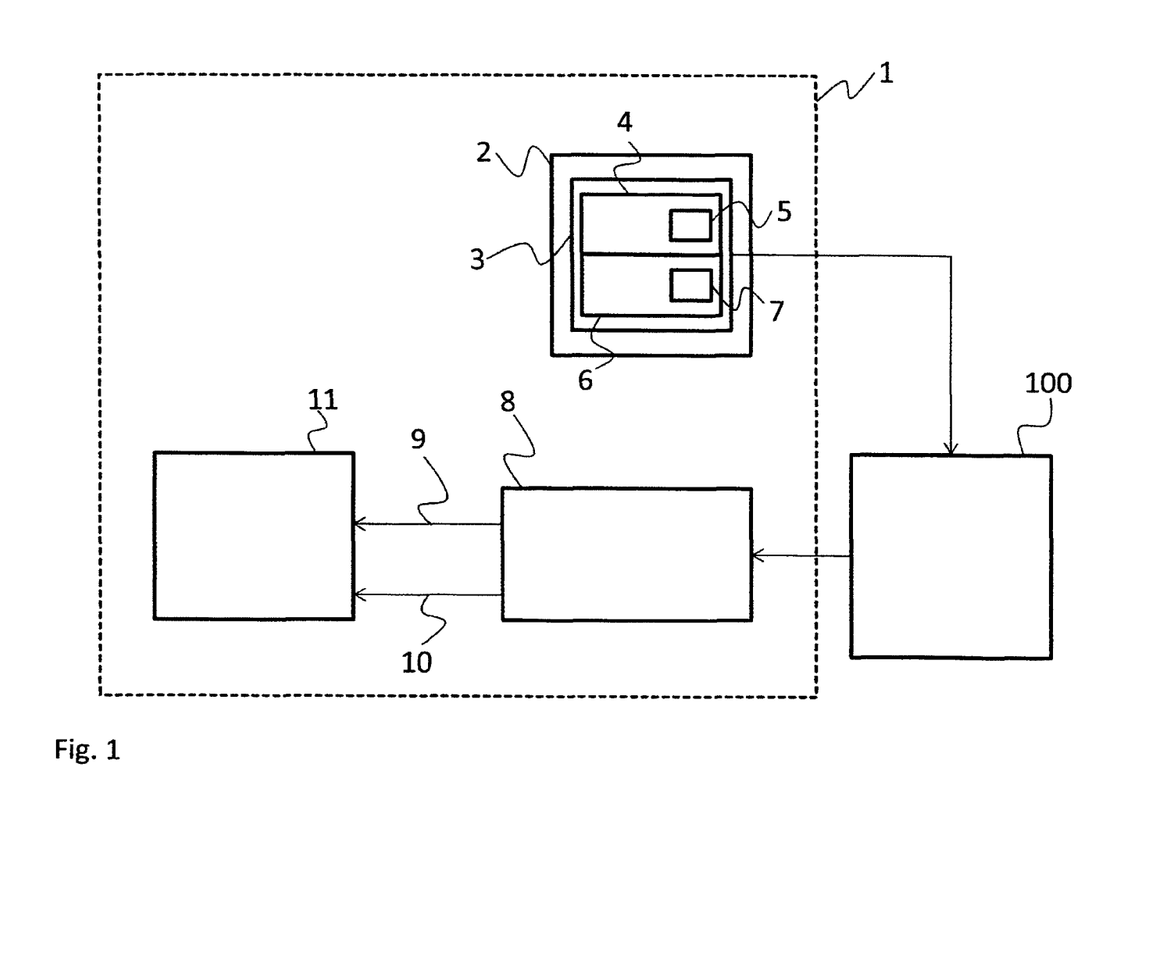
FIG. 1 shows a block diagram of an embodiment of a testing system according to an embodiment of the present invention.

In FIG. 1 the testing system 1 comprises a data source 2, which provides video and audio data 3 to a video and audio reproduction system 100. In the video and audio data 3 single video frames 4 and audio frames 6 are provided each with a unique mark 5, 7. Note that although only one video frame 4 and only one audio frame 6 are shown in FIG. 1, any number of audio frames and video frames is possible. The unique marks 5 in the video frames 4 can be any type of visible code, but codes, which can easily be machine-evaluated, are preferred. Such codes can e.g. comprise barcodes, QR-codes or the like. The unique marks 7 in the audio frames 6 can e.g. be sounds of a single frequency that varies for every audio frame, like e.g. a sinusoidal 1000 Hz wave or the like.

In order to distinguish the single audio frames 6, the frequency of the unique marks 7 varies for every frame by a predetermined first threshold. The first threshold can e.g. be 1000 Hz. That means that for every consecutive frame the frequency of the unique mark 7 is incremented by 1000 Hz or 1 kHz.

Following this scheme would lead to frequencies, which cannot be reproduced or recorded any more. Therefore, a minimum and a maximum frequency are specified. The minimum frequency can be 1000 Hz, i.e. 1 kHz, and the maximum frequency can be 20000 Hz, i.e. 20 kHz. These frequency values are mere examples. Any other frequencies can be used, which can be reproduced by the video and audio reproduction system 100 and can be recorded by a respective recording unit 8.

The above scheme leads to twenty different frequencies, i.e. twenty different unique marks 7 in the frequency range from 1000 Hz to 20000 Hz. After reaching 20000 Hz, the frequencies of the marks start over from the minimum frequency. In order to further distinguish the single audio frames 6, in a repetition of the frequency range or scale, in every repetition a second threshold value is added to the single frequencies. The second threshold value can e.g. be 20 Hz. Therefore, if the frequency of the first mark 7 is 1000 Hz, the frequency of the $21^{st}$ mark 7 would be 1020 Hz. Furthermore, the frequency of the $20^{th}$ mark 7 would be 20000 Hz, and the frequency of the $40^{th}$ mark 7 would be 20020 Hz. In the next repetition the second threshold would be incremented by its' initial value, i.e. 20 Hz. Therefore, in the second repetition the respective frequencies would be 1040 Hz, and 20040 Hz. This is further specified in FIG. 3 and the respective description.

The video and audio reproduction system 100 can be any type of display combined with speakers, like e.g. a television set, a smartphone, a pc or the like.

The data source 2 can e.g. be provided as a data file on a USB stick or a memory card, which is inserted in the respective video and audio reproduction system 100. As an alternative, the data source 2 can e.g. comprise a streaming server, which provides the video and audio data 3 via a wired or wireless network connection to the video and audio reproduction system 100.

While the video and audio reproduction system 100 reproduces the video and audio data 3 a recording unit 8 records the video and the audio, which is reproduced by the video and audio reproduction system 100. The recording unit 8 provides respective video streams 9 and audio streams 10 to the test processor 11. The test processor 11 analyses the video streams 9 and audio streams 10 regarding synchrony by evaluating the single unique marks 5, 7 of video frames 4 and audio frames 6 in the video streams 9 and audio streams 10.

In order to analyse the single marks 5 of the video stream 9, the test processor 11 can simply decode the respective code, if this is not already done by the recording unit 8, like e.g. in the case of a barcode scanner.

The analysis of the single marks 7 of the audio stream 10 requires a little more effort. In order to extract the frequency of the marks 7 the test processor 11 performs a Short-Time-Fourier transformation of the recorded audio stream 10.

Just as an example the length of the time windows used for the Short-Time-Fourier transformation can be 220 samples at a sample rate of 44.1 kHz with an overlap of the windows of 176 samples.

The unique marks 5 in the video frames 4 can e.g. comprise in text form the frequency of the respective audio frame. Therefore, by simply looking for every video frame 4 or every unique mark 5 for the correct mark 7 and comparing the time when the video frame was recorded with the time when the mark 7 was recorded, allows determining the displacement between audio and video reproduction in the video and audio reproduction system 100.

Figure 2:
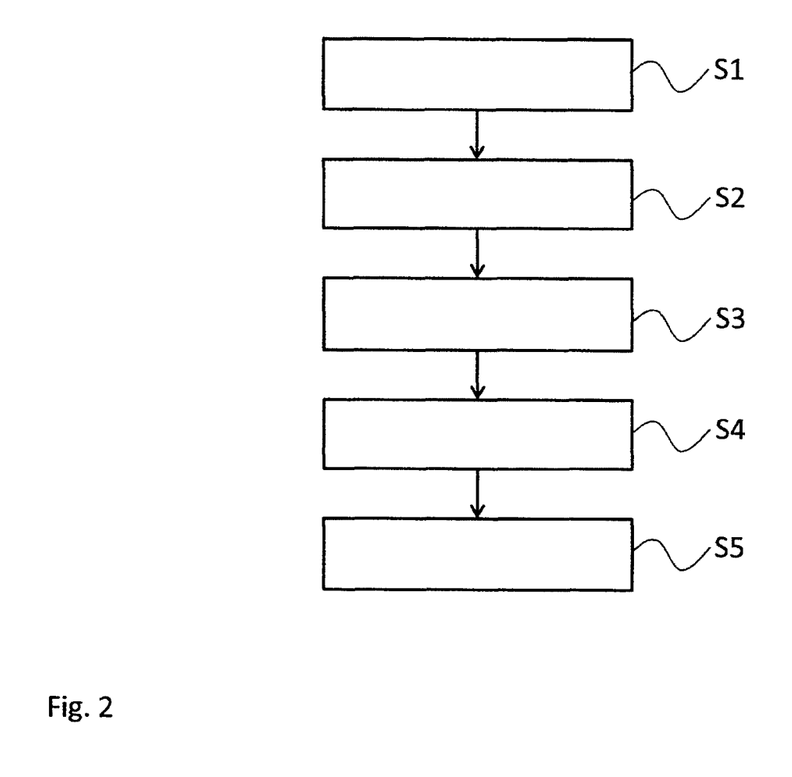
FIG. 2 shows a flow diagram of an embodiment of a testing method according to an embodiment of the present invention.

FIG. 2 shows a flow diagram of a testing method for a video and audio reproduction system 100, 101.

As a basis for measuring asynchrony between video and audio reproduction in the video and audio reproduction system 100, 101, the method comprises providing S1 a data source 2 with video and audio data 3, 61. The video and audio data 3, 61 comprises unique marks 5, 65-67, 7, 46-53, 71-73 in every video frame 4, 30-37, 62-64 and every audio frame 6, 38-45, 68-70. Further the video and audio data 3, 61 is reproduced S2 with the video and audio reproduction system 100, 101.

In order to determine the asynchrony, a video stream 9, 77 and an audio stream 10, 78 generated by the video and audio reproduction system 100, 101 based on the video and audio data 3, 61 are recorded, S3. Further, the unique marks 5, 65-67, 7, 46-53, 71-73 are extracted S4 from the recorded video stream 9, 77 and the recorded audio stream 10, 78.

Finally, asynchrony between video and audio reproduction in the video and audio reproduction system 100 is determined by verifying S5 if respective unique marks 5, 65-67, 7, 46-53, 71-73 of simultaneous video frames 4, 30-37, 62-64 and audio frames 6, 38-45, 68-70 have been recorded by the recording device 8, 74 simultaneously. Any asynchrony can then be determined via the displacement between respective unique marks 5, 65-67, 7, 46-53, 71-73 of simultaneous video frames 4, 30-37, 62-64 and audio frames 6, 38-45, 68-70.

The unique marks 5, 65-67 in the video frames 4, 30-37, 62-64 can be provided as an optical code, especially a barcode or a QR code, comprising a unique identification number for said video frame 4, 30-37, 62-64.

Further, an audio frame 6, 38-45, 68-70 is provided as an audio sequence with the length of a respective video frame 4, 30-37, 62-64, and the unique marks 7, 46-53, 71-73 in the audio frames 6, 38-45, 68-70 are provided as an audio code, like a sinusoidal sound wave of a respective frequency.

The frequencies of the sinusoidal sound waves range from a minimum frequency to a maximum frequency, and the frequencies of the sinusoidal sound waves of two consecutive audio frames 6, 38-45, 68-70 are spaced apart by a first threshold value.

Further, the frequencies of the sinusoidal sound waves are sequentially increased by the first threshold value until the maximum frequency is reached and then are reverted to the minimum frequency plus a second threshold value wherein the second threshold value increases with every repetition of the frequency sequence by its starting value.

During the verifying S5 in order to extract the respective frequency from an audio frame 6, 38-45, 68-70 a Short-Time-Fourier transformation of the recorded audio stream 10, 78 is performed. The length of the time windows used for the Short-Time-Fourier transformation is smaller than the length of the audio frames 6, 38-45, 68-70 and video frames 4, 30-37, 62-64. Finally, the time difference between a video frame 4, 30-37, 62-64 and the according audio frame 6, 38-45, 68-70 is analysed based on the results of the Short-Time-Fourier transformation.

Figure 3:
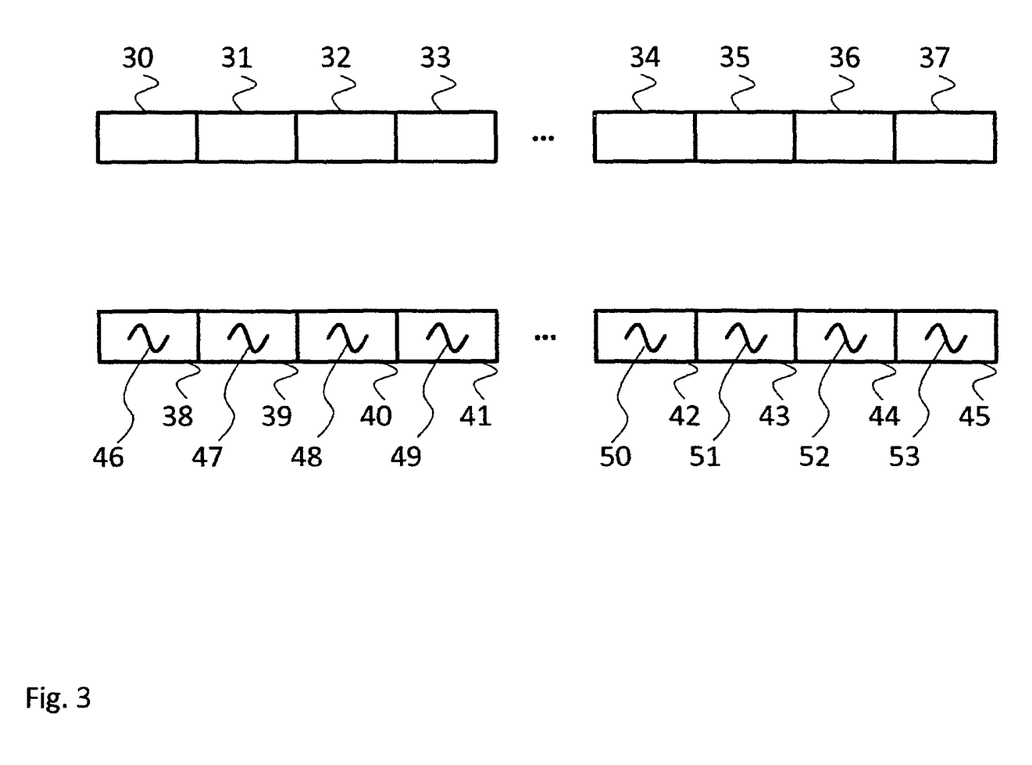
FIG. 3 shows a diagram of an embodiment of video and audio data according to an embodiment of the present invention.

FIG. 3 shows a diagram of an embodiment of video and audio data 3.

The video frames 30 to 37 each comprise a (not shown) unique visible mark, like a barcode. At the same time, every one of the audio frames 38 to 45 comprises a respective unique mark 46 to 53.

In the testing system 1, 60 the marks of the video frames 30 to 37 and the marks 46 to 53 of the audio frames 38 to 45 are related to each other. The relation can e.g. be established by the marks of the video frames 30 to 37 comprising a text representation of the frequencies of the respective marks 46 to 53 of the audio frames 38 to 45. Alternatively a table or any other form of relation database can be provided, where marks of the video frames 30 to 37 and the marks 46 to 53 of the audio frames 38 to 45 are linked to each other.

The following table shows a possible frequency distribution for the marks 46 to 53.

| Code | Frequency |
|---|---|
| 1000 | 1000 |
| 1001 | 2000 |
| 1002 | 3000 |
| ... | ... |
| 1019 | 19000 |
| 1020 | 1020 |
| 1021 | 2020 |
| 1022 | 3020 |

The scheme of the above table ensures that the neighbouring frequencies differ at least by 1000 Hz and close tones ($\Delta f=20$ Hz) are spaced apart by 20 frames in time. For example the frame with ID 1000 is assigned the frequency of f1=1000 Hz. The following ID 1001 does not use a frequency of 1020 Hz, but of 2000 Hz instead. In this way the frequency is increased by 1000 Hz until it reaches the maximum value (in this case 19000 Hz). Then the frequency falls back to the initial 1000 Hz plus 20 Hz, i.e. 1020 Hz. In the next iteration the frequencies start from 1040 Hz, and so on.

Figure 4:
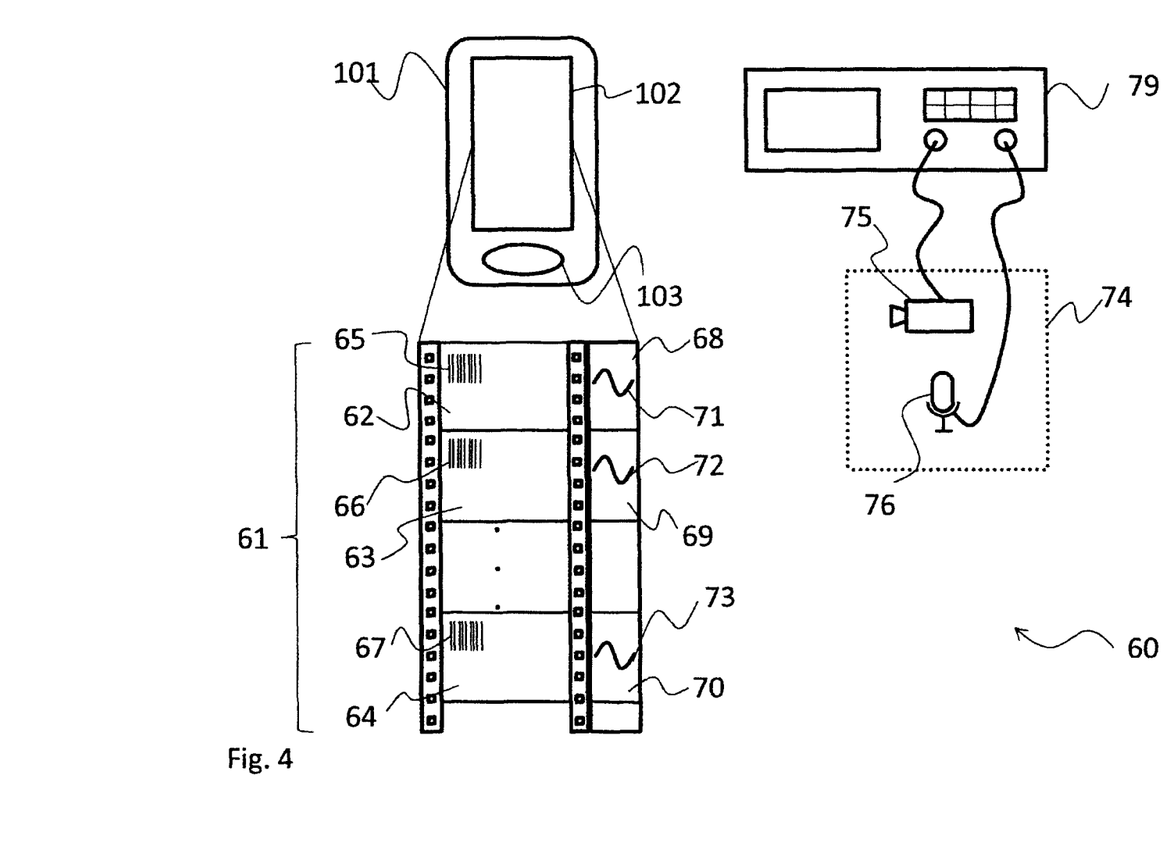
FIG. 4 shows a block diagram of an embodiment of a testing system according to an embodiment of the present invention.

FIG. 4 shows a testing system 60, which uses a test rig 79 as test processor and a camera 75 together with a microphone 76 in the recording unit 74 to record the video and audio, which is reproduced by the smartphone 101 via the screen 102 and the speaker 103.

In FIG. 4 the smartphone 101 plays a video file 61, which was previously copied into the memory of the smartphone 101. As an alternative the smartphone 101 could receive the video file 61 from the test rig 79 or any other server via a wireless or wired network connection or via a USB device, which could e.g. be coupled to the smartphone via an OTG connector.

The video file comprises video frames 62 to 64, which each comprise barcodes 65 to 67 as unique marks. Further an audio stream with audio frames 68 to 70 is provided in the video file 61. Every audio frame has a single frequency sound 71 to 73 as unique mark.

In FIG. 4 a dedicated test rig 79 is used to evaluate the synchrony between playback of the video frames 62 to 64 and the audio frames 68 to 70.

As an alternative the smartphone 101 itself could be used for this evaluation. For example an application could be installed on the smartphone 101, which initiates reproduction of the video and at the same time records the audio and video reproduced by the smartphone 101 in an internal memory of the smartphone. The analysis of the barcodes 65 to 67 and the single frequency sounds 71 to 73 can be performed while recording is active or after recording has finished.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

LIST OF REFERENCE SIGNS 1, 60 testing system
2 data source
3, 61 video and audio data
4, 30-37, 62-64 video frame
5, 65-67 unique mark
6, 38-45, 68-70 audio frame
7, 46-53, 71-73 unique mark
8, 74 recording unit
9, 77 video stream 10, 78 audio stream
11, 79 test processor
75 video recording unit
76 audio recording unit
100, 101 video and audio reproduction system
102 screen
103 speaker
S1-S5 method steps

The invention claimed is:

1. A testing system for a video and audio reproduction system, comprising:
a data source with video and audio data for reproduction by the video and audio reproduction system, the video and audio data comprising unique marks in every video frame and every audio frame, wherein an audio frame is an audio sequence with the length of a respective video frame and the unique marks in the audio frames comprise an audio code, especially a sinusoidal sound wave of a respective frequency, wherein the frequency of the sinusoidal sound wave ranges from a minimum frequency to a maximum frequency, wherein frequencies of sinusoidal sound waves of two consecutive audio frames are spaced apart by a first threshold value, wherein the frequencies of the sinusoidal sound waves increase sequentially by the first threshold value until the maximum frequency is reached and then fall back to the minimum frequency plus a second threshold value, and wherein the second threshold value increases with every repetition of the frequency sequence by a starting value of the frequency sequence;
a recording unit, configured to record a video stream and an audio stream generated by the video and audio reproduction system based on the video and audio data; and
a test processor, configured to extract the unique marks from the recorded video stream and the recorded audio stream, and to verify if respective unique marks of simultaneous video frames and audio frames have been recorded by the recording unit simultaneously.

2. The system of claim 1, wherein the recording unit comprises a video recording unit, which records the unique marks in the video frames, and an audio recording unit, which records the unique marks in the audio frames.

3. The system of claim 1, wherein the unique marks in the video frames comprise an optical code, especially a barcode or a QR code, comprising a unique identification number for said video frame.

4. The system of claim 1, wherein the audio code is a sinusoidal sound wave of a respective frequency.

5. The system of claim 1, wherein to extract the respective frequency from an audio frame the test processor is configured to perform a Short-Time-Fourier transformation of the recorded audio stream, where the length of the time windows used for the Short-Time-Fourier transformation is smaller than length of the audio frames and video frames.

6. The system of claim 5, wherein the test processor is configured to analyse the time difference between a video frame and the according audio frame based on the results of the Short-Time-Fourier transformation.

7. A testing method for a video and audio reproduction system, the method comprising:
providing a data source comprising video and audio data, the video and audio data comprising unique marks in every video frame and every audio frame, wherein an audio frame is an audio sequence with the length of a respective video frame and the unique marks in the audio frames comprise an audio code, especially a sinusoidal sound wave of a respective frequency, wherein the frequency of the sinusoidal sound wave ranges from a minimum frequency to a maximum frequency, wherein frequencies of sinusoidal sound waves of two consecutive audio frames are spaced apart by a first threshold value, wherein the frequencies of the sinusoidal sound waves increase sequentially by the first threshold value until the maximum frequency is reached and then fall back to the minimum frequency plus a second threshold value, and wherein the second threshold value increases with every repetition of the frequency sequence by a starting value of the frequency sequence;
reproducing the video and audio data with the video and audio reproduction system,
recording a video stream and an audio stream generated by the video and audio reproduction system based on the video and audio data;
extracting the unique marks from the recorded video stream and the recorded audio stream; and
verifying if respective unique marks of simultaneous video frames and audio frames have been recorded by the recording device simultaneously.

8. The method of claim 7, wherein the unique marks in the video frames comprise an optical code, especially a barcode or a QR code, comprising a unique identification number for said video frame.

9. The method of claim 7, wherein the audio code is a sinusoidal sound wave of a respective frequency.

10. The method of claim 7, wherein to extract the respective frequency from an audio frame a Short-Time-Fourier transformation of the recorded audio stream is performed, where the length of the time windows used for the Short-Time-Fourier transformation is smaller than the length of the audio frames and video frames.

11. The method of claim 10, wherein the time difference between a video frame and the according audio frame is analysed based on the results of the Short-Time-Fourier transformation.

12. A non-transitory computer readable medium comprising computer readable instructions, which when executed by a processor cause the processor to perform a testing method for a video and audio reproduction system, the method comprising:
providing a data source comprising video and audio data, the video and audio data comprising unique marks in every video frame and every audio frame, wherein an audio frame is an audio sequence with the length of a respective video frame and the unique marks in the audio frames comprise an audio code, especially a sinusoidal sound wave of a respective frequency, wherein the frequency of the sinusoidal sound wave ranges from a minimum frequency to a maximum frequency, wherein frequencies of sinusoidal sound waves of two consecutive audio frames are spaced apart by a first threshold value, wherein the frequencies of the sinusoidal sound waves increase sequentially by the first threshold value until the maximum frequency is reached and then fall back to the minimum frequency plus a second threshold value, and wherein the second threshold value increases with every repetition of the frequency sequence by a starting value of the frequency sequence;
reproducing the video and audio data with the video and audio reproduction system, recording a video stream and an audio stream generated by the video and audio reproduction system based on the video and audio data;

extracting the unique marks from the recorded video stream and the recorded audio stream; and verifying if respective unique marks of simultaneous video frames and audio frames have been recorded by the recording device simultaneously.

\* \* \* \* \*